US00RE33905E

United States Patent [19]

Isozaki et al.

[11] E Patent Number: Re. 33,905

[45] Reissued Date of Patent: Apr. 28, 1992

[54] CHROMIUM CARBIDE SINTERED BODY

[75] Inventors: Kei Isozaki; Yutaka Hirashima; Yasuo Imamura, all of Omuta, Japan

[73] Assignee: Denki Kagaku Kogyo Kabushiki Kaisha, Tokyo, Japan

[21] Appl. No.: 676,201

[22] Filed: Mar. 27, 1991

Related U.S. Patent Documents

Reissue of:

[64] Patent No.: 4,927,791
Issued: May 22, 1990
Appl. No.: 253,674
Filed: Oct. 3, 1988

[30] Foreign Application Priority Data

Oct. 6, 1987 [JP] Japan ..... 62-250729

[51] Int. Cl.[5] ..... C04B 35/56; C04B 35/58

[52] U.S. Cl. ..... 501/87

[58] Field of Search ..... 501/87

[56] References Cited

FOREIGN PATENT DOCUMENTS

| | | | |
|---|---|---|---|
| 59-107972 | 6/1984 | Japan | 501/87 |
| 60-145954 | 8/1985 | Japan | 501/87 |
| 952554 | 3/1964 | United Kingdom | 501/87 |

*Primary Examiner*—Mark L. Bell
*Attorney, Agent, or Firm*—Darby & Darby

[57] ABSTRACT

A chromium carbide sintered body having high toughness contains 99.5 to 50% by weight of chromium carbide and 0.5 to 50% by weight of AlN. The sintered body contains acicular crystals of chromium carbide.

8 Claims, 1 Drawing Sheet

CHROMIUM CARBIDE SINTERED BODY

Matter enclosed in heavy brackets [ ] appears in the original patent but forms no part of this reissue specification; matter printed in italics indicates the additions made by reissue.

BACKGROUND OF THE INVENTION

This invention relates to a chromium carbide sintered body. More particularly, it relates to a highly tough chromium carbide sintered body having superior corrosion resistance to molten metal or components of industrial furnaces, such as heating furnaces.

A chromium carbide sintered body has been produced with addition of various sintering aids to chromium carbide. The sintering aids so far proposed include powders of metals, such as Co, Fe, Ni or Ni-P alloys, borides such as titanium boride or zirconium boride, carbides such as tantalum carbide, boron carbide or silicon carbide, oxides such as aluminum oxide, chromium oxide or magnesium oxide, phosphides such as iron phosphide, cobalt phosphide or chromium phosphide, and nitrides such as chromium nitride, titanium nitride or aluminum nitride. These sintering aids are used in amounts of not more than 10 wt. % based on the weight of chromium carbide, and the sintering temperature is set so as not to be higher than 1500° C. (see Japanese Laid-open Patent Publication No. 107972/1984). However, the sintered body containing acicular crystals of chromium carbide cannot be obtained by this prior art technique. Concerning the structure of the chromium carbide sintered body, although coarse-sized or granular crystals have been reported, examples of formation or utilization of the needle-shaped or columnar crystals have not been found (see for example "Some Properties of Chromium Carbide Ceramic Material", Nippon Tungsten Review, Vol. 19 (1986))

Although a chromium carbide type ceramic material is known to have excellent anti-oxidation and anti-scaling properties, it has been reported that such material is not fully satisfactory in strength, hardness, fracture toughness and thermal impact resistance. Hence, the situation is that the usage of the material is restricted to skid rails or skid buttons in heating furnaces.

The fiber reinforcing method has also been practiced for improving mechanical or thermal impact resistance which represents in general the most vulnerable points of the ceramic material. This method consists in uniformly dispersing whiskers having lengths of several tens to hundreds of microns or fibers of longer lengths into the interior of the sintered body. Although some effects may be realized by this method, it cannot be said that the method has gained widespread acceptance on account of elevated costs caused by the use of whiskers and difficulties in uniformly dispersing the whiskers or fibers.

SUMMARY OF THE INVENTION

It is a principal object of the present invention to provide a chromium carbide sintered body having high toughness.

It is another object of the present invention to provide a chromium carbide sintered body that is superior in impact resistance, thermal impact resistance, strength and hardness.

These and other objects of the invention will become apparent from the following description.

In accordance with the present invention, there is provided a chromium carbide sintered body having high toughness comprising 99.5 to 50% by weight of chromium carbide and 0.5 to 50% by weight of AlN, the sintered body containing acicular crystals of chromium carbide.

DESCRIPTION OF THE INVENTION

Figure 1:
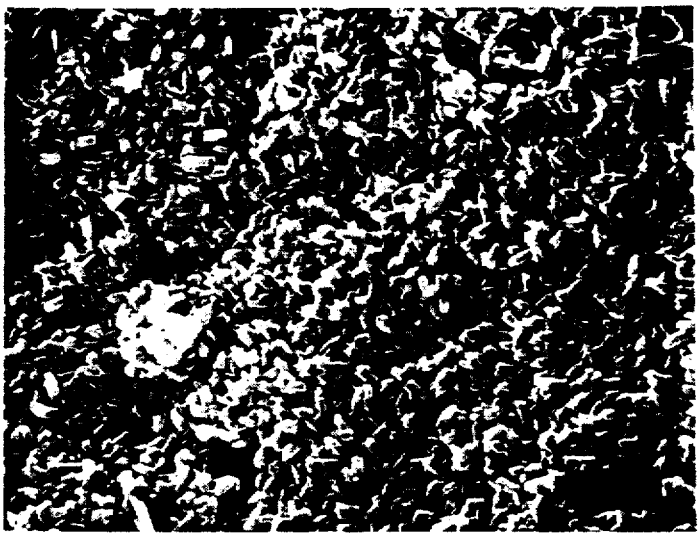
FIG. 1 is a SEM photograph showing the crystal structure of the chromium carbide sintered body according to the Run No. 6 of the Example of the invention, with the magnification factor being 5,000.

The present invention will be explained in detail hereinbelow.

The sintered body of the present invention contains chromium carbide and AlN. Other components than chromium carbide and AlN, such as $ZrB_2$, $TiB_2$, TiC or SiC, may be contained in a starting powder material within the range that does not impair the properties of the sintered body, as for example within 20% by weight, preferably 10% by weight.

There are three species of the chromium carbide, namely $Cr_3C_2$, $Cr_7C_3$ $Cr_4C$, of which $Cr_3C_2$ is most commonly employed. The raw chromium carbide powders may preferably have purity of not less than 99% and mean particle size of not more than 5 microns and preferably not more than 1 micron. Similarly, the raw AlN powders have purity of not less than 99% and mean particle size of not more than 10 microns and preferably not more than 5 microns.

Usually, a mixture of these fine powders may be obtained, respectively followed by uniformly mixing them together. However, the starting powder material may be pulverized and mixed simultaneously. The particle size of the mixture may preferably be not more than 10 microns and preferably not more than 1 micron, in terms of the mean particle size. The wet type or dry type methods may be optionally employed for pulverizing the materials.

For producing the sintered body of the present invention, the fine powder mixture prepared in the above described manner is molded by a cold press method in the case of pressureless sintering and the molded product is then sintered at around atmospheric pressure. Both hot pressing and pressureless sintering are carried out in a non-oxidizing atmosphere such as a neutral or reducing atmosphere such as in vacuum or in an argon, helium or nitrogen atmosphere, and the molded product is then sintered at atmospheric pressure. The sintering temperature is not lower than 1600° C., below which acicular crystals are not formed. The sintering time duration is advantageously 30 minutes to 12 hours. The HIP (Hot isostatic pressing) method is also effective for molding.

Briefly, the present invention resides in forming the acicular crystals of chromium carbide in the sintered body, whereby success has been realized in improving the impact resistance, thermal impact resistance, strength and hardness. For forming the acicular crystals of chromium carbide in the sintered body of the present invention, it is necessary to add a specified amount of AlN and to carry out the sintering at a temperature not lower than 1600° C. In order that the majority of the acicular crystals of chromium carbide, more concretely, not less than 20% and preferably not less than 50% of the acicular crystals in the sintered body, may have 0.1 to 10 microns in diameter and about 0.2 to 30 microns in length, it is necessary that the ratio of AlN be in the range of from 0.5to 50% by weight and preferably 5 to 30% by weight, and that the sintering conditions be controlled appropriately. With the contents of AlN less than 0.5% by weight, satisfactory acicular crystals are not produced. On the other hand, with the contents in excess of 50% by weight, the properties inherent in chromium carbide are impaired.

The sintered body of the present invention is excellent in corrosion resistance, hardness, strength and toughness and, inter alia, has a fracture toughness of not lower than 5 MPa $m^{\frac{1}{2}}$at room temperature. The sintered body of the present invention is excellent in toughness, strength and thermal impact resistance, so that it can be used in a wider field of application than in the case of the conventional chromium carbide type ceramic sintered body. More specifically, the sintered body of the present invention can be used as a protective tube for thermocouples on account of its excellent corrosion resistance against molten metal or components of industrial furnaces, such as heating furnaces. It can also be used as dies for metal forming on account of its high toughness and hardness, and as heaters or temperature sensors on account of its electrical conductivity. Also the sintered body of the invention can be worked by electric discharge machining, similarly to metals, so that the sintered body of a complex shape can be produced successfully.

EXAMPLES OF THE INVENTION

Example 1

Figure 2:
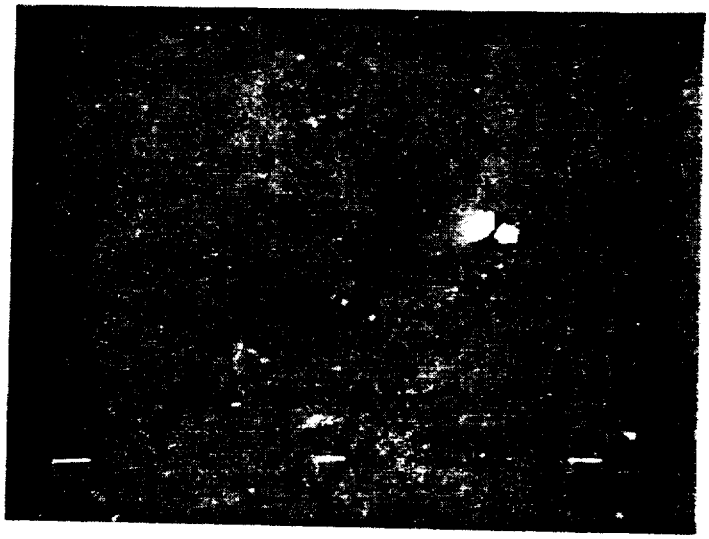
FIG. 2 is a SEM photograph similar to FIG. 1 showing the Run No. 1 of a Comparative Example.

Chromium carbide powders having a purity of not less than 99% and a mean particle size of 4 to 5 microns and AlN powders having a mean particle size of 3 to 4 microns, were separately metered out and mixed in a ball mill. The resulting mixture was molded by the CIP (cold isostatic pressing) method at a pressure of 2.7 tons/$cm^2$ for three minutes and sintered at a temperature of 1650° C. for 360 minutes under a vacuum atmosphere. The physical properties of the so-produced sintered bodies are shown in Table 1. The SEM photos showing the crystal structure of the sintered bodies of the Run No. 6 (inventive) and the Run No. 1 (comparative), with the magnification factor of 5,000, are shown in FIGS. 1 and 2, respectively.

The physical properties were measured in the following manner.

(1) The fracture toughness was measured by the IM (Indentation microfracture) method (at the room temperature).

(2) The thermal impact resistance was measured by the method of measuring the rapid cooling temperature. The flexural strength test piece of 3×4×40 mm in size was used as the sample. The test piece was heated to a predetermined temperature in an electrical furnace and maintained at this temperature for a predetermined time period (one hour). The test piece was then dropped into 0° C. water provided below the furnace and thereby cooled rapidly. The flexural strength of the test piece was measured by three point bend test, and the temperature difference between the heating temperature at which the strength of the test piece was lowered and the water temperature of 0° C. was found and designated ΔT.

(3) The ratio of formation of the acicular crystals having a diameter of 0.1 to 10 microns and a length of 0.2 to 30 microns was classified through observation with SEM. In Tables 1 and 2, the marks , Δand X indicate the ratios of formation of not less than 50% by area, 49 to 20% by area and less than 20% by area, respectively.

(4) The relative density was measured by the Archimedes method.

TABLE 1

| | Run No. | Composition (Wt. Part) $Cr_3C_2$ | AlN | Relative Density (%) | Flexural Strength at Room Temp. (MPa) | Fracture Toughness ($K_{IC}$) (MPa · $m^{\frac{1}{2}}$) | Thermal Impact Resistance ΔT (°C.) | Formation of Acicular Crystals |
|---|---|---|---|---|---|---|---|---|
| Comp. | 1 | 100 | 0 | 96.5 | 10 | — | — | X |
| Ex. | 2 | 40 | 60 | 82.3 | 55 | 3.0 | 200 | Δ |
| | 3 | 20 | 80 | 75.5 | 30 | 2.5 | 200 | X |
| Ex. | 4 | 99.5 | 0.5 | 92.1 | 300 | 5.5 | 350 | Δ |
| | 5 | 95 | 5 | 95.2 | 420 | 6.1 | 400 | ○ |
| | 6 | 90 | 10 | 97.2 | 430 | 6.2 | 450 | ○ |
| | 7 | 85 | 15 | 96.9 | 420 | 6.5 | 500 | ○ |
| | 8 | 80 | 20 | 92.5 | 305 | 6.1 | 450 | ○ |
| | 9 | 70 | 30 | 87.3 | 270 | 5.8 | 450 | ○ |
| | 10 | 60 | 40 | 85.5 | 240 | 5.7 | 400 | ○ |
| | 11 | 50 | 50 | 82.1 | 200 | 5.5 | 300 | Δ |

It is seen from Table 1 that the Examples of the present invention (Run Nos. 4 to 11) are more excellent in toughness and thermal impact resistance than the Comparative Examples (Run Nos. 1 to 3).

Example 2

Samples of the sintered bodies were produced in accordance with the Run No. 7 of the Example 1 with modified sintering temperatures and the ratios of formation of the acicular crystals were observed by SEM and classified in the same way as in Example 1. The results are shown in Table 2.

It is seen from Table 2 that the acicular crystals are not formed at the sintering temperature of lower than 1600° C.

TABLE 2

| | Run No. | Sintering Condition Temp. (°C.) | Sintering Condition Time (Min.) | Formation of Acicular Crystals | Relative Density (%) | Flexural Strength at Room Temp. (MPa) | Fracture Toughness ($K_{IC}$) (MPa · $m^{\frac{1}{2}}$) |
|---|---|---|---|---|---|---|---|
| Comp. | 12 | 1400 | 360 | X | 80.1 | 35 | 3.8 |
| Ex. | 13 | 1500 | 360 | X | 85.0 | 73 | 4.0 |
| | 14 | 1550 | 360 | X | 90.2 | 105 | 3.7 |
| Ex. | 15 | 1600 | 360 | ○ | 99.3 | 420 | 5.9 |
| | 16 | 1650 | 360 | ○ | 98.0 | 372 | 6.4 |
| | 17 | 1700 | 360 | ○ | 96.4 | 280 | 5.8 |
| | 18 | 1750 | 360 | ○ | 92.5 | 171 | 5.4 |

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims

What is claimed is:

1. A chromium carbide sintered body having high toughness comprising 99.5 to 50% by weight of $Cr_3C_2$ and 0.5 to 50% by weight of AlN, said sintered body being obtained by sintering $Cr_3C_2$powders *and AlN powders* at a temperature of 1600° C. to 1750° C., and said sintered body containing not less than 20% by area of acicular crystals of $Cr_3C_2$ as observed from an SEM photograph.

2. The chromium carbide sintered body according to claim 1 wherein the majority of the acicular crystals of $Cr_3C_2$ has a diameter of 0.1 to 10 microns and a length of 0.2 to 30 microns.

3. The chromium carbide sintered body according to claim 1 wherein said sintered body is obtained by sintering $Cr_3C_2$ powders having a purity of not less than 99% and a means particle size of not more than 5 microns and AlN powders having a purity of not less than 99% and a mean particle size of not ore than 10 microns.

4. The chromium carbide sintered body according to claim 1 wherein said sintered body is obtained by sintering $Cr_3C_2$ powders and AlN powders for 30 minutes to 12 hours.

5. The chromium carbide sintered body according to claim 4 wherein the sintering is performed under a non-oxidizing atmosphere selected from the group consisting of vacuum, argon, helium and nitrogen.

6. The chromium carbide sintered body according to claim 4 wherein the sintering is performed by a hot press method.

7. The chromium carbide sintered body according to claim 4 wherein the sintering is performed by a cold press molding method followed by a pressureless sintering method.

8. The chromium carbide sintered body according to claim 2 wherein the acicular crystals of the $Cr_3C_2$ of 0.1 to 10 microns in diameter and of 0.2 to 30 microns in length are contained in an amount of not less than 20%.

* * * * *